United States Patent
Kitano et al.

(10) Patent No.: US 10,638,741 B2
(45) Date of Patent: May 5, 2020

(54) BRAKING DEVICE FOR DUAL-BEARING REEL

(71) Applicant: Shimano Inc., Sakai, Osaka (JP)

(72) Inventors: Hiroyuki Kitano, Osaka (JP); Yuichiro Ishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/368,637

(22) Filed: Mar. 28, 2019

(65) Prior Publication Data

US 2019/0335734 A1   Nov. 7, 2019

(30) Foreign Application Priority Data

May 2, 2018 (JP) .................................. 2018-088625

(51) Int. Cl.
*A01K 89/01* (2006.01)
*A01K 89/0155* (2006.01)

(52) U.S. Cl.
CPC .............................. *A01K 89/01555* (2013.01)

(58) Field of Classification Search
CPC ....................... A01K 89/0155; A01K 89/01555
See application file for complete search history.

(56) References Cited

U.S. PATENT DOCUMENTS

| 2004/0148843 A1* | 8/2004 | Ikuta | A01K 89/01555 43/21 |
|---|---|---|---|
| 2006/0169813 A1* | 8/2006 | Nakagawa | A01K 89/01555 242/288 |
| 2007/0108330 A1* | 5/2007 | Ikuta | A01K 89/01555 242/288 |
| 2008/0173745 A1* | 7/2008 | Takechi | A01K 89/01903 242/321 |
| 2009/0166459 A1* | 7/2009 | Niitsuma | A01K 89/01555 242/287 |
| 2013/0037645 A1* | 2/2013 | Niitsuma | A01K 89/01555 242/288 |
| 2017/0013819 A1* | 1/2017 | Komemushi | A01K 89/01555 |
| 2017/0172130 A1* | 6/2017 | Komemushi | A01K 89/01557 |
| 2017/0208788 A1* | 7/2017 | Numata | A01K 89/056 |

FOREIGN PATENT DOCUMENTS

JP    2004-208631 A    7/2004

* cited by examiner

*Primary Examiner* — Emmanuel M Marcelo
(74) *Attorney, Agent, or Firm* — Global IP Counselors, LLP

(57) ABSTRACT

A braking device for a dual-bearing reel for braking a spool rotatably mounted on a reel body, includes a spool brake and a spool controller. The spool brake is configured to brake the spool by electromagnetic induction during casting of a fishing line. The spool controller is configured to control a braking force of the spool brake by controlling an ON/OF-state of current that is generated due to the electromagnetic induction at a prescribed period. The spool controller has a period changer configured to change the prescribed period for braking the spool.

6 Claims, 4 Drawing Sheets

BRAKING DEVICE FOR DUAL-BEARING REEL

CROSS-REFERENCE TO RELATED APPLICATIONS

This application claims priority to Japanese Patent Application No. 2018-088625, filed on May 2, 2018. The entire disclosure of Japanese Patent Application No. 2018-088625 is hereby incorporated herein by reference.

BACKGROUND

Field of the Invention

The present invention relates to a spool braking device for a dual-bearing reel, in particular, to a spool braking device for a dual-bearing reel that brakes a spool rotatably mounted on a reel body.

Background Art

A conventional dual-bearing reel includes a spool braking device that brakes a spool in order to prevent backlash at the time of casting (refer to Japanese Published Unexamined Application No. 2004-208631). In this spool braking device, when the spool rotates, a magnet that rotates integrally with the spool and a coil disposed on a reel body rotate relative to each other. In this state, using ON/OFF-control of the switch at a set period, current can flow through the coil and the spool is braked.

In the spool braking device described above, the spool is braked by turning the switch ON and OFF with a constant period. In this case, when the switching period is a prescribed ratio, a non-negative integer multiple, for example, of the period through which current flows through the coil due to the rotation of the spool, there is the risk that the braking force with respect to the spool will change significantly from a set value due to resonance.

SUMMARY

The present invention was made in light of the problem described above, and an object of the present invention is to provide a braking device (brake) for a dual-bearing reel that can stably apply a braking force to the spool.

According to one aspect of the present invention, the braking device for a dual-bearing reel is a device for braking a spool rotatably mounted on a reel body.

The braking device for a dual-bearing reel comprises a spool braking unit (spool brake) and a spool control unit (spool controller). The spool braking unit brakes the spool by electromagnetic induction during the unreeling (casting) of a fishing line. The spool control unit is configured to be capable of controlling the braking force of the spool braking unit by controlling the ON/OFF-state of the flow of current that is generated due to the electromagnetic induction at a prescribed period. The spool control unit comprises a period changing unit (period changer). The period changing unit changes the prescribed period for braking the spool described above.

In the present braking device for a dual-bearing reel, since the spool control unit has a period changing unit, it is possible to change the prescribed period for braking the spool in accordance with the period of the current that flows through the coil due to the rotation of the spool. As a result, the problem described above can be solved, and it is possible to stably apply a braking force to the spool.

The braking device for a dual-bearing reel according to another aspect of the present invention preferably further comprises a rotation detection unit (rotation detector). Here, the rotation detection unit is configured to be capable of detecting spool rotational information. The spool control unit further comprises a rotational speed calculation unit (rotational speed calculator) that calculates the rotational speed of the spool based on the rotational information of the spool. The period changing unit changes the prescribed period for braking the spool in accordance with the rotational speed of the spool.

Here, by changing the prescribed period for braking the spool in accordance with the rotational speed of the spool, it is possible to stably apply the braking force to the spool.

In the braking device for a dual-bearing reel according to another aspect of the present invention, the spool control unit preferably further comprises a rotational speed setting unit (rotational speed setter). In this embodiment, the rotational speed setting unit sets the rotational speed for changing the period based on the prescribed period for braking the spool. The period changing unit changes the prescribed period for braking the spool based on the rotational speed for changing the period.

Here, by changing the prescribed period for braking the spool based on the rotational speed for changing the period, it is possible to stably apply the braking force to the spool.

In the braking device for a dual-bearing reel according to another aspect of the present invention, the period changing unit preferably changes the prescribed period for braking the spool when the rotational speed of the spool is within a prescribed range that includes the rotational speed for changing the period.

Here, when the rotational speed of the spool is within the prescribed range including the rotational speed for changing the period, the braking force can be applied stably to the spool.

In the braking device for a dual-bearing reel according to another aspect of the present invention, the spool control unit preferably further comprises a deceleration determination unit (deceleration determiner). Here, the deceleration determination unit determines whether the rotational speed of the spool has decelerated based on the rotational speed of the spool. When the rotational speed of the spool is decelerating and is within the prescribed range including the rotational speed for changing the period, the period changing unit changes the prescribed period for braking the spool.

Here, when the rotational speed of the spool is decelerating within the prescribed range including the rotational speed for changing the period, the braking force can be applied stably to the spool.

In the braking device of a dual-bearing reel according to another aspect of the present invention, the spool control unit preferably further comprises a period setting unit (period setter). In this embodiment, the period setting unit sets the prescribed period for braking the spool to a specified value. When the rotational speed of the spool is outside the prescribed range that includes the rotational speed for changing the period, the period setting unit sets the prescribed period for braking the spool to a specified value.

Here, it is possible to stably apply a braking force to the spool, for example, if the above-described problem does not occur when the rotational speed of the spool is not within the prescribed range described above.

In the braking device for a dual-bearing reel according to another aspect of the present invention, the spool control unit preferably further comprises a maximum speed recognition unit (maximum speed recognizer). In this embodiment, the maximum speed recognition unit recognizes the maximum rotational speed of the spool based on time-series data of the rotational speed of the spool. When the rotational speed of the spool is less than the maximum rotational speed, the period changing unit changes the prescribed period for braking the spool.

Here, by changing the prescribed period for braking the spool after the rotational speed of the spool reaches the maximum rotational speed, it is possible to stably apply the braking force to the spool.

In the present invention, it is possible to stably apply the braking force to the spool in the braking device for a dual-bearing reel.

DETAILED DESCRIPTION OF THE EMBODIMENT

Figure 1:
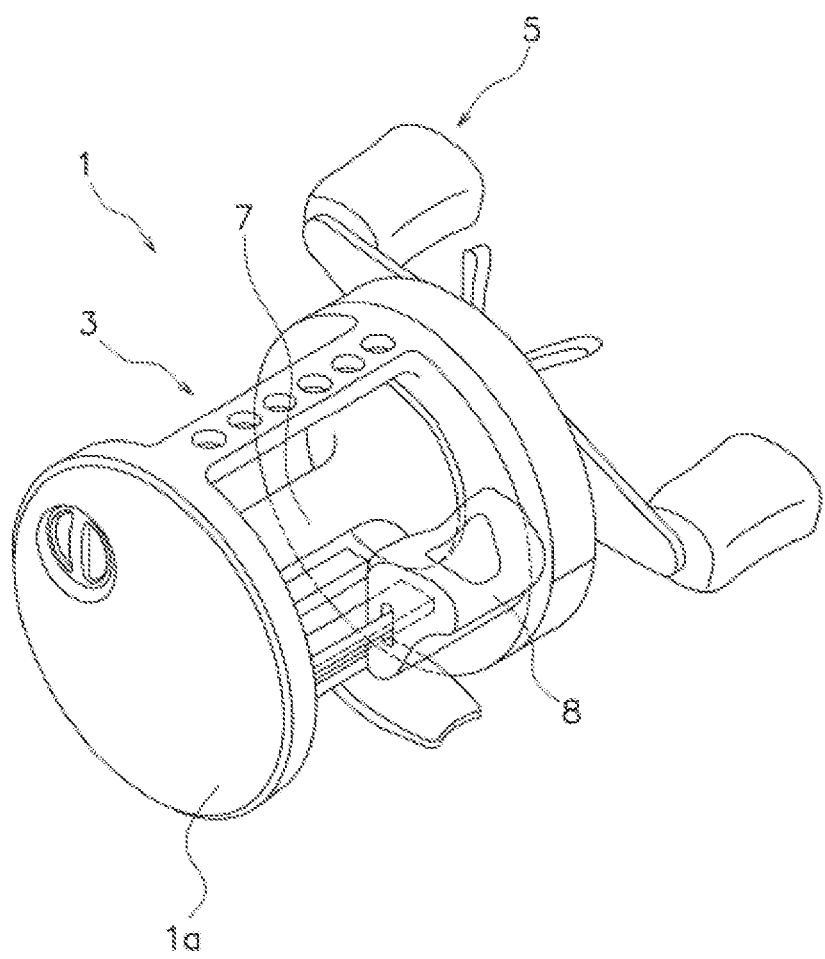
FIG. 1 is a perspective view of a dual-bearing reel to a first embodiment of the present invention.
Figure 2:
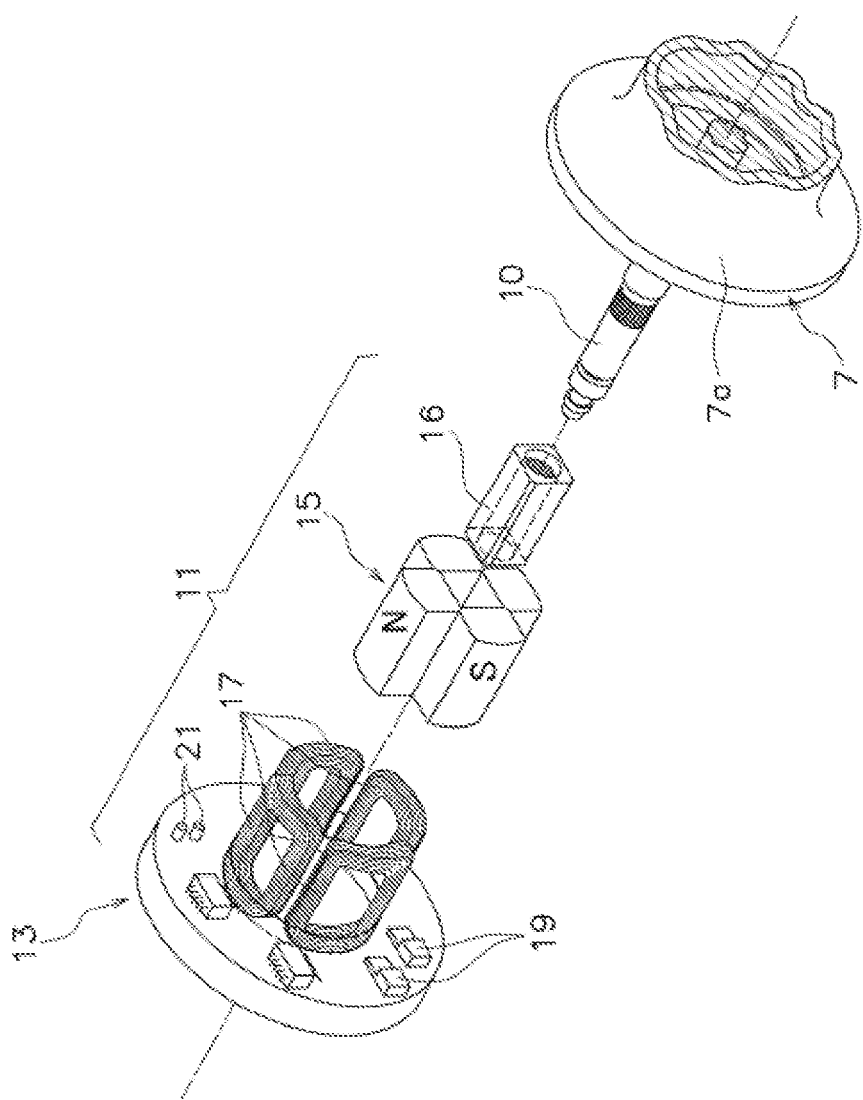
FIG. 2 is an exploded perspective view for explaining a spool braking device of a dual-bearing reel.

As shown in FIG. 1, a dual-bearing reel 1, applied to a first embodiment of the present invention, comprises a reel body 3, a handle 5, a spool 7, and a spool braking device (spool brake) 9 (refer to FIG. 2: one example of a braking device (brake) for a dual-bearing reel).

The handle 5 is disposed on the reel body 3 so as to be rotatable. Fishing line is wound around the spool 7. The spool 7 is mounted on the reel body 3 so as to be rotatable. When clutch 8 is in the ON-state, for example, the spool 7 rotates relative to the reel body 3 in conjunction with the rotation of the handle 5. On the other hand, when the clutch 8 is in the OFF-state, the spool 7 rotates freely with respect to the reel body 3.

The spool braking device 9 is a device for braking the spool 7 that is rotatably mounted on the reel body 3. The spool braking device 9 is disposed inside the reel body 3. As shown in FIG. 2, the spool braking device 9 comprises a spool braking unit (spool brake) 11 (one example of a spool braking unit) and a circuit board 13 (one example of a spool control unit or spool controller).

Spool Braking Unit

The spool braking unit 11 is for braking the spool 7 by electromagnetic induction during the casting of the fishing line. As shown in FIG. 2, the spool braking unit 11 has a rotor 15 that includes multiple (for example, four) magnets 14, multiple (for example, four) coils 17, a switch element 19, and a rotational speed sensor 21 (one example of a rotation detection unit or rotation detector).

The rotor 15 is configured to be integrally rotatable with the spool 7. The rotor 15 is attached to a spool shaft 10 via a holder 16 so as to be integrally rotatable with the spool shaft 10. The spool shaft 10 is attached to the spool 7 so as to be integrally rotatable with the spool 7. The multiple magnets 14 are arranged side by side in the direction of rotation of the spool shaft 10.

The multiple coils 17 are provided in the reel body 3. Here, the multiple coils 17 are provided on the circuit board 13 that is fixed to the reel body 3. The multiple coils 17 are arranged on opposite sides of the rotor 15 on the outer peripheral side of the rotor 15. The multiple coils 17 are arranged side by side in the direction of rotation of the spool shaft 10. The multiple coils 17 are arranged to be essentially coaxial with a spool shaft core of the spool shaft 10 while in a fixed state with the reel body 1 via the circuit board 13.

The switch element 19 connects the two end portions of the series-connected multiple coils 17 or disconnects the two end portions of the series-connected multiple coils 17. In the switch ON-state, the switch element 19 connects the two end portions of the multiple series-connected coils 17. In the switch OFF-state, on the other hand, the two end portions of the multiple series-connected coils 17 are disconnected. The ON/OFF-control of the switch element 19 is carried out by means of the circuit board 13.

In the spool braking unit 11, when the spool 7 rotates relative to the reel body 3, the magnets 14 rotate relative to the coils 17. In this state, when the switch element 19 is controlled to be in the ON-state, an electric current is generated in the coils 17, and the rotor 15 having the multiple magnets 14, i.e., the spool 7, is braked.

A rotational speed sensor 21 is configured to be capable of detecting rotational information of the spool 7. The rotational speed sensor 21 is, for example, a reflection type switch having a light-projecting unit (light projector) and a light-receiving unit (light receiver). The light-projecting unit and the light-receiving unit are arranged facing a flange portion 7a of the spool 7. Here, the light-projecting unit and the light-receiving unit are disposed on the circuit board 13 facing the flange portion 7a of the spool 7.

A reflection pattern (not shown) that reflects the light that is irradiated from the light-projecting unit is disposed on the flange portion 7a of the spool 7, for example, on the outer side surface of the flange portion 7a. When the light that is irradiated from the light-projecting unit is reflected by the reflection pattern, the reflected light is recognized by the light-receiving unit. As a result, the rotational information of the spool 7, for example, the rotational speed of the spool 7, is recognized.

Circuit Board

The circuit board 13 is configured to be capable of controlling the braking force of the spool braking unit 11 by controlling the ON/OFF-state of the current that is generated due to electromagnetic induction at a prescribed period. The circuit board 13 is attached to the reel body 3, for example, to a side cover 1a (refer to FIG. 1).

Figure 3:
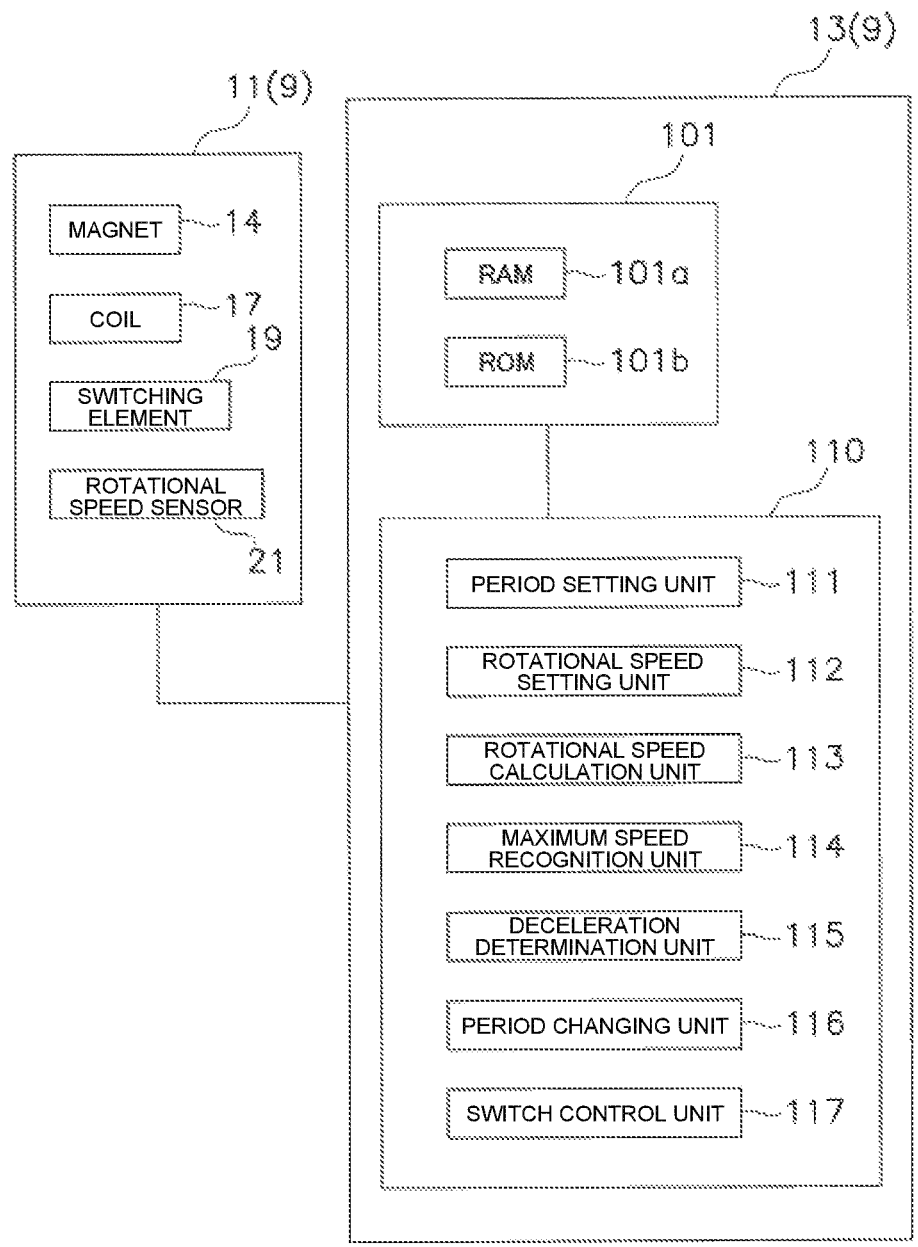
FIG. 3 is a control block diagram of a circuit board.

As shown in FIG. 3, the circuit board 13 has a recording unit (recorder) 101 and a control unit 110. The recording unit 101 and the control unit 110 will be described separately, but here it can be stated that the control unit 110 may be composed of a microcomputer equipped with, for example, a CPU, RAM, ROM, I/O interface, etc.

Recording Unit

The recording unit 101 includes, for example, a RAM 101a (Random-Access Memory) and a ROM 101b (Read-Only Memory). A control program and the various control data that are used when the control program is executed, are recorded in the recording unit 101, for example.

Control Unit

The control unit 110 includes a CPU (Central Processing Unit). The control unit 110 executes the control program based on the various information data stored in a storage unit. The control unit 110 thereby controls the braking force of the spool braking unit 11.

The control unit 110 includes a period setting unit (period setter) 111, a rotational speed setting unit (rotational speed setter) 112, a rotational speed calculation unit (rotational speed calculator) 113, a maximum speed recognition unit (maximum speed recognizer) 114, a deceleration determination unit (deceleration determiner) 115, and a period changing unit (period changer) 116. The control unit 110 further includes a switch control unit (switch controller) 117.

Rotational Speed Calculation Unit

The rotational speed calculation unit 113 calculates the rotational speed V of the spool 7 based on the rotational information of the spool 7 detected by the rotational speed sensor 21. For example, the rotational speed calculation unit 113 calculates the rotational speed V of the spool 7 based on a signal detected by the rotational speed sensor 21 (by the light-projecting unit 21a and the light-receiving unit 21b). The rotational speed V of the spool 7 is recorded in the recording unit 101, for example, the RAM 101a, at pre-scribed time intervals. Time-series data of the rotational speed V of the spool are thereby created in the recording unit 101, for example, in the RAM 101a.

Period Setting Unit

The period setting unit 111 sets a first PWM period (one example of a prescribed period for braking the spool) to a specified value. For example, the period setting unit 111 reads the specified value from the recording unit 101, for example, the ROM 101b, and sets this specified value as the first PWM period.

In addition, the period setting unit 111 sets a second PWM period (described further below) to a specified value, such as 1000 ($\mu$s), when the rotational speed V of the spool is not within a prescribed range. The predetermined range will be described further below.

Here, the first PWM period and the second PWM period are used when the switch element 19 is ON/OFF-controlled. PWM is an acronym for "Pulse Width Modulation."

Rotational Speed Setting Unit

The rotational speed setting unit (rotational speed setter) 112 sets a rotational speed for changing the period based on the first PWM period. The rotational speed for changing the period corresponds to a rotational speed at which variations in the braking force applied to the spool 7 are large.

For example, the rotational speed for changing the period corresponds to the rotational speed of the spool 7 when an induction period becomes a non-negative integer multiple of the first PWM period. The induction period is the period of the current that flows through the coils 17 due to the rotation of the spool 7 (magnets 14).

Here, the rotational speed setting unit 112 calculates the rotational speed for changing the period using a prediction equation having the first PWM period as a parameter. The calculated rotational speed for changing the period is recorded in the recording unit 100, for example, the RAM 101a.

For example, if the rotational speed for changing the period is expressed as "PV" and the first PWM period is expressed as "TP1," the rotational speed PV for changing the period can be calculated using a prediction equation, for example, "$PV=(30 \times TP1)/(2^n)$" "n" is a non-negative integer.

In the present embodiment, an example in which "TP1=1000 ($\mu$s)" and "n=1" will be described. Here, from the prediction equation described above, the rotational speed PV for changing the periodic calculated as "15000 (rpm)." That is, when the rotational speed V of the spool 7 reaches the rotational speed PV (15000 (rpm)) for changing the period, the variation in the braking force to the spool 7 increases.

Deceleration Determination Unit

The deceleration determination unit 115 determines whether the rotational speed V of the spool has decelerated based on the rotational speed V of the spool. For example, the deceleration determination unit 115 reads the time-series data of the rotational speed V of the spool from the recording unit 101 and determines whether the rotational speed V of the spool has decelerated based on the time-series data of the rotational speed V of the spool.

Here, the deceleration determination unit 115 determines that the rotational speed V of the spool is decelerating when the rotational speed V of the spool continuously decelerates based on the time-series data. If the rotational speed V of the spool is not continuously decelerating based on the time-series data, the deceleration determination unit 115 determines that the rotational speed V of the spool is not decelerating.

Maximum Speed Recognition Unit

The maximum speed recognition unit 114 recognizes the maximum rotational speed VM of the spool 7 based on the time-series data of the rotational speed V of the spool. For example, the maximum speed recognition unit 114 reads the time-series data of the rotational speed V of the spool from the recording unit 101 for example, the RAM 101a, and recognizes the maximum rotational speed VM of the spool 7 based on the time-series data of the rotational speed V of the spool.

Period Changing Unit

The period changing unit (period changer) 116 changes the first PWM periodTP1. More specifically, the period changing unit 116 changes the first PWM periodTP1 in accordance with the rotational speed V of the spool. More specifically, the period changing unit 116 changes the first PWM periodTP1 based on the rotational speed PV for changing the period.

For example, when the rotational speed V of the spool is within a prescribed range including the rotational speed PV for changing the period, the period changing unit 116 changes the first PWM periodTP1 to the second PWM periodTP2.

The second PWM period TP2 is a period that is different from the first PWM period TP1. The second PWM period TP2 is set to a value recorded in the ROM 101b, for example, to 768 ($\mu$s).

Here, when the rotational speed V of the spool is greater than or equal to a first rotational speed V1 and less than or equal to the rotational speed PV for changing the period (V1≤V≤PV), the period changing unit 116 changes the first PWM period TP1 to the second PWM period TP2. Here, the first rotational speed V1 is set to a lower limit speed in the prescribed range, and the rotational speed PV for changing the period is set to an upper limit speed in the prescribed range.

The first rotational speed V1 is calculated by subtracting the prescribed rotational speed dV recorded in the recording unit 101, for example, the ROM 101*b*, from the rotational speed PV for changing the period. A prescribed value previously recorded in the recording unit 101, for example, the ROM 101*b* may be directly assigned to the first rotational speed V1. This prescribed value is smaller than the rotational speed PV for changing the period.

In addition, when the rotational speed V of the spool is less than the maximum rotational speed VM, the period changing unit 116 changes the first PWM period TP1. More specifically, when the rotational speed V of the spool is less than the maximum rotational speed VM and is within a prescribed range including the rotational speed PV for changing the period, the period changing unit 116 changes the first PWM period TP1.

Here, when the rotational speed of the spool is greater than or equal to the first rotational speed V1 and less than or equal to the rotational speed PV for changing the period (V1≤V≤PV) after the maximum speed recognition unit 114 recognizes the maximum rotational speed VM of the spool 7, the period changing unit 116 changes the first PWM period TP1 to the second PWM period TP2.

In addition, when the rotational speed V of the spool is decelerating and is within the prescribed range including the rotational speed PV for changing the period, the period changing unit 116 changes the first PWM period TP1.

Here, when the rotational speed V of the spool is greater than or equal to the first rotational speed V1 and less than or equal to the rotational speed PV for changing the period (V1≤V≤PV), after the deceleration determination unit 115 determines that the rotational speed V of the spool is decelerating, the period changing unit 116 changes the first PWM period TP1 to the second PWM period TP2.

Switch Control Unit

The switch control unit 117 controls the ON/OFF-state of the switch element 19. For example, when the rotational speed V of the spool 7 reaches a rotational speed at which the spool braking unit 11 is caused to generate braking force, the switch control unit 117 controls the ON/OFF-state of the switch element 19.

Here, the rotational speed at which the spool braking unit 11 is caused to generate braking force, for example, the range of the rotational speed at which the spool braking unit 11 is caused to generate braking force, is recorded in the recording unit 101, for example, the ROM 101*b*. The switch control unit 117 carries out the ON/OFF-control described above by reading the range of the rotational speed at which the spool braking unit 11 is caused to generate a braking force from the recording unit 101 for example, the ROM 101*b*.

In the ON/OFF-control of the switch control unit 117, the first PWM period TP1 or the second PWM period TP2 described above is used. More specifically, in the ON/OFF-control of the switch control unit 117, the PWM (Pulse Width Modulation) corresponding to the first PWM period TP1 or the PWM corresponding to the second PWM period TP2 described above is used. Since the ON/OFF-control of the switch control unit 117 is configured to be the same as in the conventional configuration, a detailed description thereof is omitted.

Mode of Controlling the Spool Braking Unit

When casting in the clutch-off state, the fishing line is unreeled from the spool 7. Then, when the spool 7 starts to rotate, the magnets 14 on the inner peripheral side of the coils 17 rotate. In this state, when the switch element 19 is turned ON, current flows through the coils 17 and the spool 7 is braked.

When the spool 7 is braked in this manner, the circuit board 13 controls the braking force of the spool braking unit 11 in the following manner.

First, when the spool 7 starts to rotate, the rotational speed calculation unit 113 starts to calculate the rotational speed V of the spool 7 based on a signal detected by the rotational speed sensor 21 (S1). By recording the rotational speed V of the spool 7 in the RAM 101*a* at prescribed time intervals, time-series data of the rotational speed V of the spool is created in the RAM 101*a* (S2).

Next, the period setting unit 111 reads the specified value, for example, 1000 (µs), from the ROM 101*b* and sets the first PWM period TP1 to 1000 (µs) (S3). In addition, the rotational speed setting unit 112 sets the rotational speed PV for changing the period to 15000 (rpm) based on the above-described prediction equation (S4). The rotational speed PV for changing the period is recorded in the RAM 101*a*.

Here, the deceleration determination unit 115 monitors the time-series data of the rotational speed V of the spool created in the RAM 101*a* and determines whether the spool 7 has decelerated (S5). For example, if the spool 7 is not decelerating (No in S5), the deceleration determination unit 115 recognizes that the spool 7 is accelerating or rotating at a constant speed. During this time, the process of Step S5 (S5) is repeatedly executed.

If, on the other hand, the deceleration determination unit 115 determines that the spool 7 has decelerated (Yes in S5), the deceleration determination unit 115 sets a flag indicating the deceleration of the spool 7 in the time-series data of the rotational speed V of the spool. By this flag, the maximum speed recognition unit 114 recognizes the rotational speed V of the spool before the spool 7 starts to decelerate as the maximum rotational speed VM of the spool 7 (S6). Then, the switch control unit 117 uses the first PWM period TP1 and starts the ON/OFF-control of the switch element 19 at a prescribed timing (S7).

The maximum speed recognition unit 114 may directly monitor the time-series data of the rotational speed V of the spool and recognize the maximum rotational speed VM of the spool 7 based on the time-series data of the rotational speed V of the spool.

The period changing unit 116 then changes in the first PWM period TP1 in the following manner (S8, S9). The period changing unit 116 changes the first PWM period TP1 to the second PWM period TP2 (S9) based on the rotational speed PV for changing the period (S8).

For example, it is determined whether the rotational speed V of the decelerating spool is less than or equal to the rotational speed PV for changing the period (V≤PV) (S8). Here, when the rotational speed V of the decelerating spool is less than or equal to the rotational speed PV for changing the period (Yes in S8), the period changing unit 116 changes the first PWM period TP1 to the second PWM period TP2 (S9).

Then, the switch control unit 117 uses the second PWM period TP2 and controls the ON/OFF-state of the switch element 19 (S10). If the rotational speed V of the decelerating spool is greater than or equal to the rotational speed PV for changing the period (No in S8), the process of Step S7 (S7) is executed.

In this state, it is determined whether the rotational speed V of the decelerating spool is greater than or equal to the first rotational speed V1 (V1≤V) (S11). Here, if the rotational speed V of the decelerating spool is greater than or equal to the first rotational speed V1 (Yes in S11), the process of Step S10 (S10) is executed.

That is, until the rotational speed V of the decelerating spool reaches the rotational speed PV for changing the period and passes the first rotational speed V1, the switch control unit 117 uses the second PWM period TP2 and controls the ON and OFF of the switch element 19 (Yes in S8 to Yes in S11).

Here, if the rotational speed V of the decelerating spool is less than the first rotational speed V1 (No in S11), the period setting unit 111 sets the second PWM period TP2 to a specified value, for example, 1000 (μs) (S13). That is, with this process, the second PWM period TP2 is returned to the first PWM period TP1. Then, the switch control unit 117 uses the first PWM period TP1 and controls the ON/OFF-state of the switch element 19 (S13).

Finally, it is determined whether the rotational speed V of the decelerating spool has reached a rotational speed at which the braking of the spool 7 is stopped (S14). Here, if the rotational speed V of the decelerating spool has reached the rotational speed at which the braking of the spool 7 is stopped (Yes in S14), the switch control unit 117 ends the ON/OFF-control of the switch element 19 (S15).

If the rotational speed V of the decelerating spool has not reached the rotational speed at which the braking of the spool 7 is stopped (No in S14), the switch control unit 117 uses the first PWM period TP1 and continues the ON/OFF-control of the switch element 19 (S13).

SUMMARY

In the spool braking device 9, since the circuit board 13 includes the period changing unit 116, it is possible to change the first PWM period TP1 in accordance with the period (induction period) of the current that flows through the coils 17 due to the rotation of the spool 7 (magnets 14).

Here, for example, when the induction period becomes a non-negative integer multiple of the PWM period, the period changing unit 116 changes the first PWM period TP1 to the second PWM period TP2. As a result, it is possible to solve the problem that the braking force applied to the spool changes greatly from the set value due to resonance, and to apply the braking force stably to the spool 7.

OTHER EMBODIMENTS

One embodiment of the present invention was described above, but the present invention is not limited to the above-described embodiment, and various modifications can be made without departing from the scope of the invention. In particular, the various embodiments described in the present Specification may be combined in any manner as needed.

In the embodiment described above, an example was presented in which one non-negative integer (for example, 1) is set to the parameter n of the prediction equation, but at least two non-negative integers from among multiple non-negative integers may be set to the parameter n of the prediction equation. In addition, a non-negative integer other than "1" may be set to the parameter n of the prediction equation.

In the embodiment described above, an example was presented in which the rotational speed PV for changing the period is calculated using the prediction equation, but the rotational speed PV for changing the period may be directly set without using the prediction equation.

In the present embodiment, an example was presented in which the "prescribed range" is a "range that is greater than or equal to the first rotational speed V1 and less than or equal to the rotational speed PV for changing the period," but the "prescribed range" may be freely set as long as the range includes the "rotational speed PV for changing the period."

For example, the "prescribed range" may be set to "greater than or equal to the first rotational speed V1 and less than or equal to a second rotational speed V2." In this embodiment, the second rotational speed V2 is set such that the rotational speed PV for changing the period takes on a value that is between the first rotational speed V1 and the second rotational speed V2.

Figure 4:
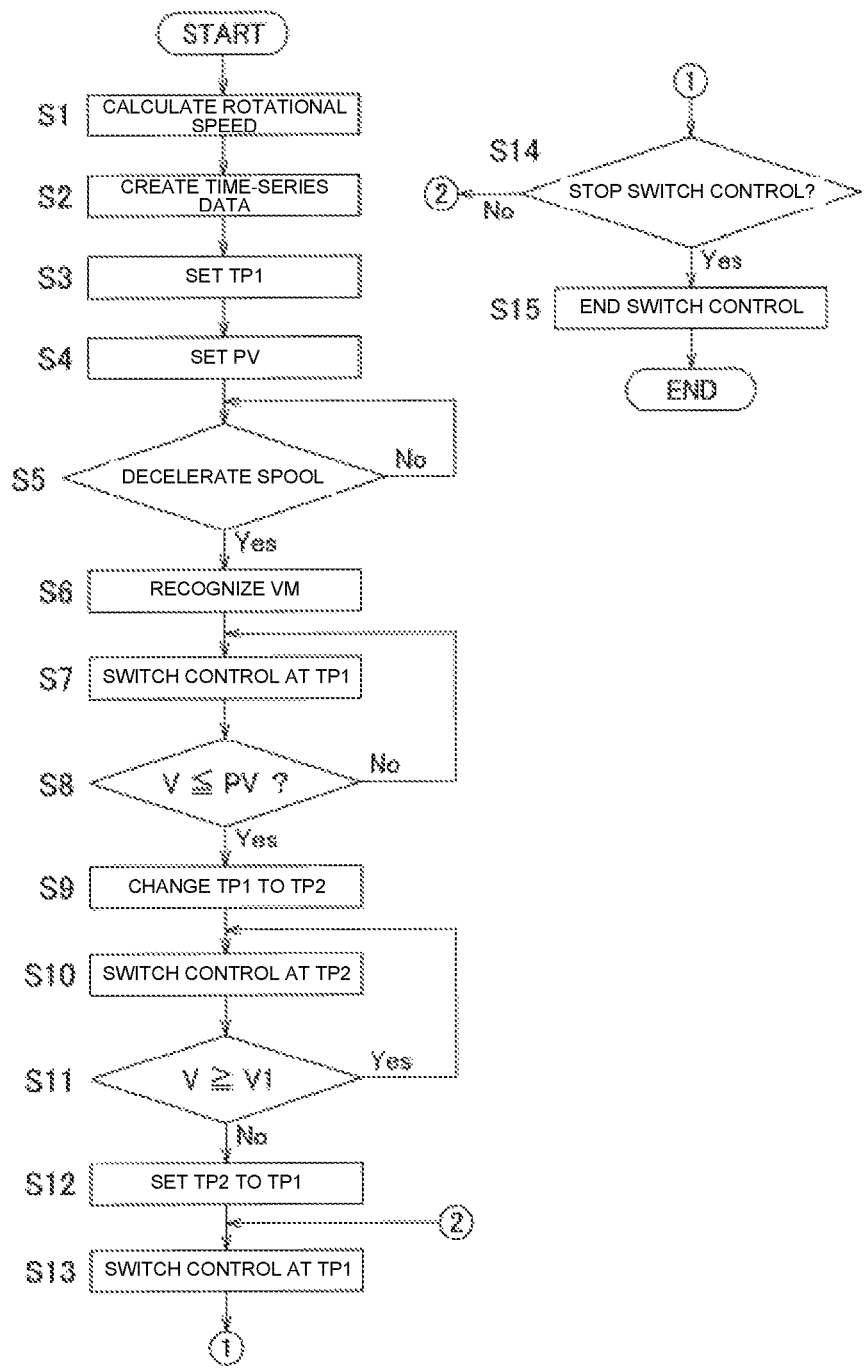
FIG. 4 is a flowchart showing a control process executed by the circuit board.

In this embodiment, for example, the determination of Step 8 (S8) in FIG. 4, for example, "V≤PV?" is replaced with "V≤V2?". As a result, as the rotational speed PV for changing the period is approached, the first PWM period TP1 is changed to the second PWM period TP2 before the rotational speed V of the spool 7 reaches the rotational speed PV for changing the period, for example.

What is claimed is:
1. A braking device for a dual-bearing reel for braking a spool rotatably mounted on a reel body, comprising:
   a spool brake configured to brake the spool by electromagnetic induction during casting of a fishing line;
   a spool controller configured to control a braking force of the spool brake by controlling an ON/OF-state of current that is generated due to the electromagnetic induction at a prescribed period; and
   a rotation detector configured to detect rotational information of the spool,
   the spool controller further comprises a rotational seed calculator configured to calculate the rotational speed of the spool based on the rotational information of the spool and the spool controller having a period changer configured to change the prescribed period for braking the spool in accordance with the rotational speed of the spool.
2. The braking device for a dual-bearing reel according to claim 1, wherein
   the spool controller further comprises a maximum speed recognizer configured to recognize a maximum rotational speed of the spool based on time-series data of the rotational speed of the spool, and
   when the rotational speed of the spool is lower than the maximum rotational speed, the period changer changes the prescribed period for braking the spool.
3. A braking device for a dual-bearing reel for braking a spool rotatably mounted on a reel body, comprising:
   a spool brake configured to brake the spool by electromagnetic induction during casting of a fishing line; and
   a spool controller configured to control a braking force of the spool brake by controlling an ON/OF-state of current that is generated due to the electromagnetic induction at a prescribed period,
   the spool controller having a period changer configured to change the prescribed period for braking the spool,
   the spool controller further comprises a rotational speed setter configured to set a rotational speed for changing a period based on the prescribed period for braking the spool, and the period changer is configured to change the prescribed period for braking the spool based on the rotational speed for changing the period.

4. The braking device for a dual-bearing reel according to claim 3, wherein
when the rotational speed of the spool is within a prescribed range including the rotational speed for changing the period, the period changer changes the prescribed period for braking the spool.

5. The braking device for a dual-bearing reel according to claim 4, wherein
the spool controller further comprises a deceleration determiner configured to determine whether the rotational speed of the spool has decelerated based on the rotational speed of the spool, and
when the rotational speed of the spool is decelerating and is within the prescribed range, the period changer changes the prescribed period for braking the spool.

6. The braking device for a dual-bearing reel according to claim 4, wherein
the spool controller has a period setter configured to set the prescribed period for braking the spool to a specified value, and
when the rotational speed of the spool is not within the prescribed range, the period setter sets the prescribed period for braking the spool to the specified value.

* * * * *